US010649486B1

(12) United States Patent
Ekner et al.

(10) Patent No.: US 10,649,486 B1
(45) Date of Patent: May 12, 2020

(54) APPARATUS AND METHODS FOR ACCURATE LATENCY MEASUREMENTS IN INTEGRATED CIRCUITS

(71) Applicant: INTEL CORPORATION, Santa Clara, CA (US)

(72) Inventors: Hartvig Ekner, Holte (DK); Dines Justesen, Vanløse (DK); Daniel A. Temple, Herlev (DK)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 15/392,427

(22) Filed: Dec. 28, 2016

(51) Int. Cl.
*G06F 1/14* (2006.01)
(52) U.S. Cl.
CPC ...................................... *G06F 1/14* (2013.01)
(58) Field of Classification Search
CPC ........................................................ G06F 1/14
USPC .......................................................... 702/79
See application file for complete search history.

(56) References Cited

U.S. PATENT DOCUMENTS

| 5,872,518 | A | * | 2/1999 | Kushita | ................ | G08B 3/1066 340/2.1 |
|---|---|---|---|---|---|---|
| 6,990,597 | B2 | | 1/2006 | Abe et al. | | |
| 9,083,478 | B2 | | 7/2015 | Schmit | | |
| 9,118,566 | B1 | | 8/2015 | Mendel et al. | | |
| 9,331,714 | B1 | | 5/2016 | Yang et al. | | |
| 9,369,363 | B2 | | 6/2016 | Schmit | | |
| 2002/0047738 | A1 | | 4/2002 | Kamihara | | |
| 2008/0304599 | A1 | * | 12/2008 | Furtner | ................. | G09G 5/006 375/340 |
| 2015/0117504 | A1 | * | 4/2015 | Harriman | ............. | G06F 13/385 375/224 |

OTHER PUBLICATIONS

IEEE Standard for a Precision Clock Synchronization Protocol for Networked Measurement and Control Systems, Jul. 24, 2008, 289 pages, IEEE Std 1588-2008 (Revision of IEEE Std 1588-2002).
Pedro Moreira, et al. "White Rabbit: Sub-Nanosecond Timing Distribution over Ethernet", Oct. 12-16, 2009, pp. 58-62, ISPCS 2009 International IEEE Symposium on Precision Clock Syncronization for Measurement, Control and Communication, Brescia, Italy.
Altera—CPRI MegaCore Function User Guide, Jun. 2012, 11 pages, Altera Corporation, San Jose, CA.

* cited by examiner

*Primary Examiner* — Ricky Ngon (57) ABSTRACT

One embodiment relates to a method of performing a latency measurement within an integrated circuit. Receipt of a word that contains a beginning of a frame is detected by a frame begin detect circuit in a decoding circuit block. A begin frame detected signal is fed back to the physical media attachment circuit, and an asynchronous signal from the physical media attachment circuit is transmitted at a beginning of a subsequent frame to a time measurement circuit in a core of the integrated circuit. A bitcount may be used to generate a synchronous signal that is also transmitted to the core. At the core of the integrated circuit, a first time is measured that corresponds to receipt of the asynchronous signal and a second time is measured that corresponds to receipt of the synchronous signal. A latency is determined at least by subtracting the first time subtracted from the second time. Other embodiments and features are also disclosed.

20 Claims, 6 Drawing Sheets

APPARATUS AND METHODS FOR ACCURATE LATENCY MEASUREMENTS IN INTEGRATED CIRCUITS

BACKGROUND

Technical Field

The present disclosure relates to latency measurements in integrated circuits.

Description of the Background Art

Timestamping protocols, such as the IEEE-1588 standard, for example, may be used to synchronize clocks across a data network to very high precision. However, the limit of the synchronization accuracy depends on the accuracy of the timestamps placed on packets entering and leaving the network port which is normally the device transceiver.

Hence, in order to generate the timestamps, the latency (delay) between the device core and the transceiver must be measured. For high-speed transceiver channels, estimating the latency with sufficient accuracy for timestamping packets under a protocol such as IEEE-1588 is a challenging task.

Other protocols, such as the CPRI standard, require that network latency be deterministic, repeatable and symmetrical, which also requires that latency between the network port and the device core be accurately measured in order to apply appropriate compensation.

SUMMARY

One embodiment relates to a method for performing a latency measurement within an integrated circuit. A bitcounter is incremented by a number of bits in data words received, and a bitcount sequence is output from the bitcounter. An asynchronous signal is transmitted at a predetermined count in the bitcount sequence. In addition, information indicating the predetermined bitcounter value is generated as a synchronous signal that is also transmitted to the core along with the data. Measurements may be made of a first time corresponding to receipt of the asynchronous signal and a second time corresponding to receipt of the synchronous signal. The latency may be then calculated by subtracting the first time from the second time. Further adjustments to the latency may be optionally made.

Another embodiment relates to a method of performing a latency measurement within an integrated circuit. Receipt of a word that contains a beginning of a frame is detected by a frame begin detect circuit in a decoding circuit block. A begin frame detected signal is fed back to the physical media attachment circuit, and an asynchronous signal from the physical media attachment circuit is transmitted at a beginning of a subsequent frame to a time measurement circuit in a core of the integrated circuit.

In addition, information indicating the location of the beginning of the frame is generated as a synchronous signal that is also transmitted to the core together with the data. At the core of the integrated circuit, a first time may be measured that corresponds to receipt of the asynchronous signal, and a second time may be measured that corresponds to receipt of the synchronous signal. The latency may be then calculated by subtracting the first time from the second time. Further adjustments to the latency may be optionally made.

Other embodiments and features are also disclosed.

DETAILED DESCRIPTION

Protocols such as CPRI and IEEE 1588 requires the delay (latency) seen in a device from the time the signal reaches the pin until the signal reaches a given measurement point to be known. At higher bandwidths, forward error correction (FEC) and other similar functions are likely to introduce a variable delay that needs to be measured.

The present disclosure provides an apparatus and method to measure latency within an integrated circuit chip. The apparatus and method is highly precise and may be generally applied to cover various different encodings. As encodings used continue to become more complicated, the presently-disclosed solution becomes more valuable.

Figure 1:
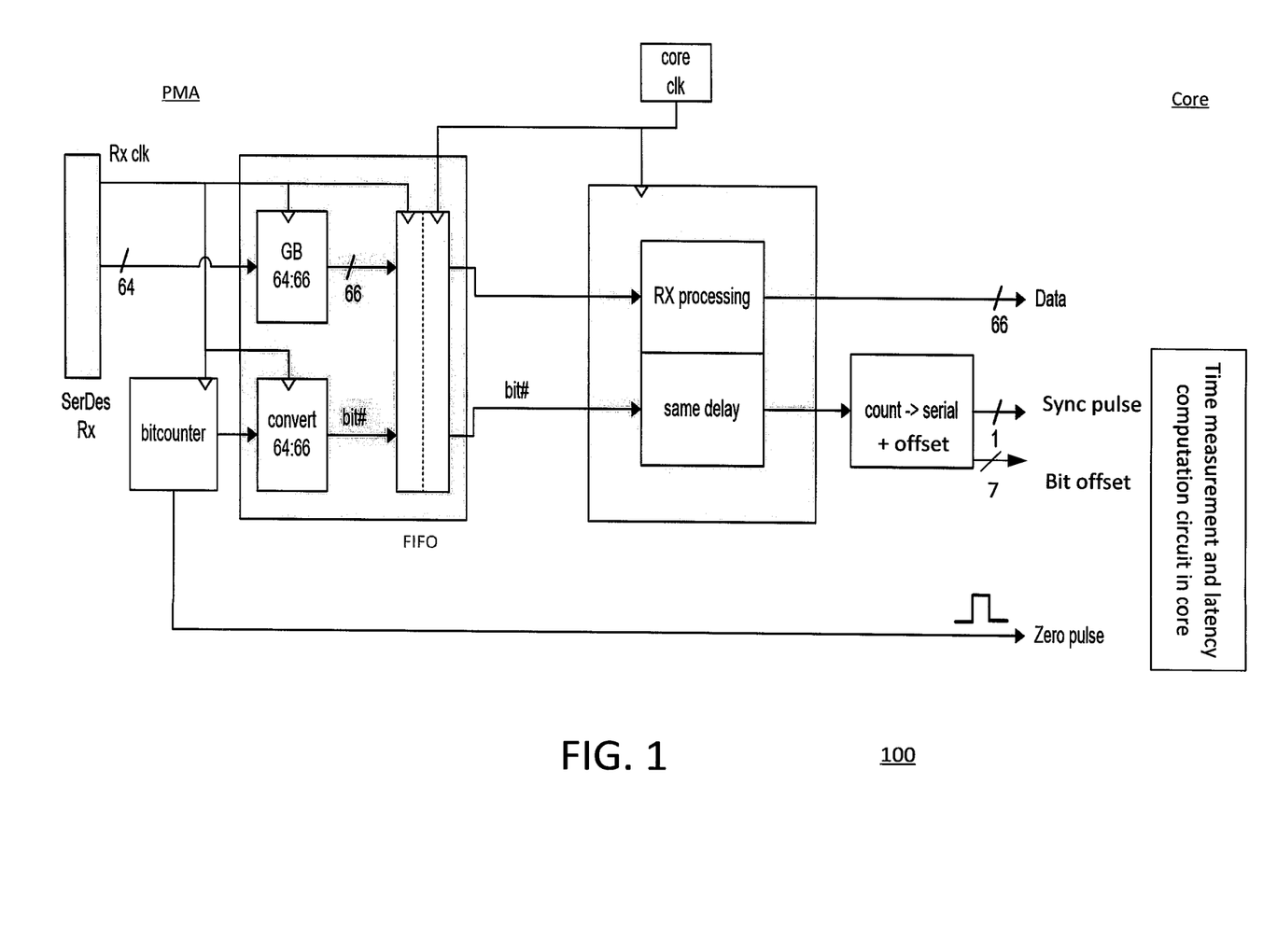
FIG. 1 depicts circuit apparatus for measuring latency of receiver processing circuitry in accordance with an embodiment of the invention.
Figure 2:
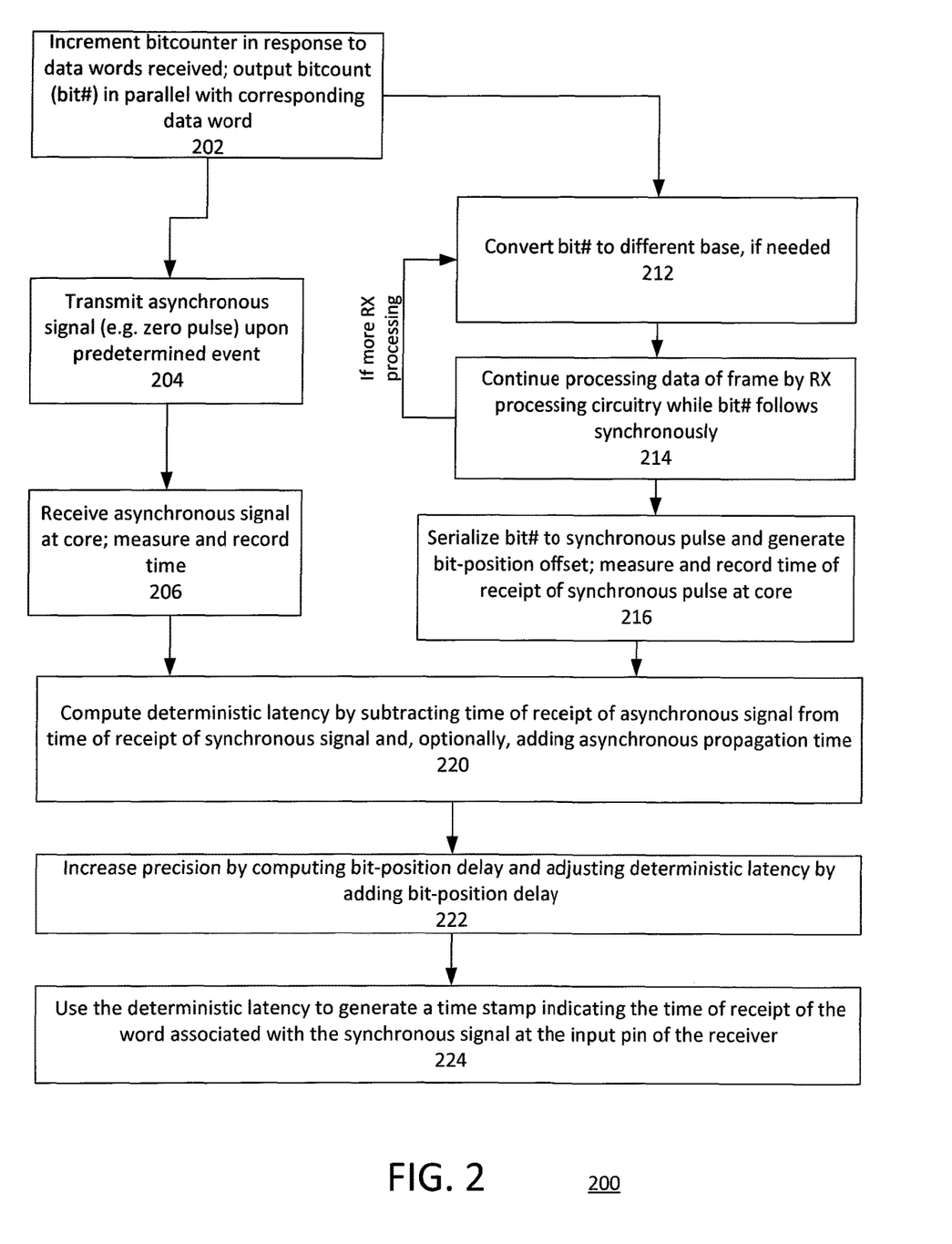
FIG. 2 is a flow chart of a method of measuring latency of receiver processing circuitry using the circuit apparatus of FIG. 1 in accordance with an embodiment of the invention.

FIG. 1 depicts circuit apparatus 100 for measuring latency of receiver (RX) processing circuitry in accordance with an embodiment of the invention. FIG. 2 is a flow chart of a method 200 of measuring latency of RX processing circuitry using the circuit apparatus 100 of FIG. 1 in accordance with an embodiment of the invention.

The circuit apparatus 100 and method 200 may be used for measuring precisely a variable delay between an input/output pin and a point of measurement within the integrated circuit. The delay measurement may be made across various type of RX processing circuitry, such as physical coding sublayer circuitry and media access layer circuitry, for example.

Per step 202 of the method 200 of FIG. 2, in response to data words being received from the deserializer circuit (SerDes Rx) of the receiver, a bitcounter circuit is incremented by the number of bits in the data words. The bitcounter resets to zero at a predetermined count so as to effectively give a unique bit-number (bit #) to each bit within a bitcount cycle length of the data stream. An exemplary bitcounter circuit may be implemented in the physical media attachment (PMA) circuitry after the deserializer circuit, as depicted in FIG. 1. For each data word received, the bitcounter circuit is incremented by the width of the data word. For example, if the data word is 64 bits wide, as depicted in FIG. 1, then the bitcounter circuit shall be incremented by 64 for each word received. For example, the bitcounter circuit may be incremented from 0 to 64, then from 64 to 128, and so on. The bitcount value for a given word represents the bit-number (bit #) of the bit within the word that arrived first at the deserializer.

Further per step 202, the bitcount is output in parallel with the corresponding data word. From this point on, the bitcount follows the data path synchronously. As depicted in FIG. 1, the 64 bits of the data word are output from SerDes RX to the 64:66 gearbox (GB 64:66), and the bit # is output from the bitcounter circuit to the 64:66 converter circuit (convert 64:66).

Per step 204, an asynchronous signal is transmitted at a predetermined count in the bitcount sequence. In the exemplary implementation shown in FIG. 1, the bitcounter circuit may have a configurable maximum value, after which it wraps to zero. On a wrap event, a "zero pulse" (the asynchronous signal) may be sent asynchronously to the core logic of the integrated circuit chip.

Per step 206, the asynchronous signal may be received at the core logic, and the time of receipt of the asynchronous signal may be measured and recorded. As shown in FIG. 1, this step may be performed by time measurement and latency computation circuitry located in the core of the integrated circuit.

While steps 204 and 206 relate to the generation, transmission and receipt of the asynchronous signal, steps 212 through 216 relate to the generation, transmission and receipt of the synchronous signal. Generally speaking, the asynchronous signal travels to the core much more quickly than the synchronous signal because the synchronous signal is delayed to be synchronous with the RX processing of the data.

Per step 212, the bitcount may be converted to a different base, if needed (for example, due to the presence of a gearbox circuit). In the exemplary implementation shown in FIG. 1, the 64:66 converter circuit (convert 64:66) converts the bitcount from a base of 64 to a base of 66. In other words, the 64:66 converter receives input bitcounts of 0, 64, 128, 192, 256, . . . and generates output bitcounts of 0, 66, 132, 198, . . . . This conversion is performed so that the bitcounts are correct for both the 64-bit data words input into GB 64:66 and the 66-bit data words output from GB 64:66.

Per step 214, processing of the data continues by the RX processing circuitry, while the bitcount (bit #) follows synchronously. The synchronous following may be accomplished as follows: if a section of the data processing takes N clock cycles, then the bitcount stored in that section may be incremented by the equivalent of N data words for each N clock cycles. Note that, the RX processing may include further gearboxes. If so, then further conversion of the bitcount to a different base may be performed so as to compensate for such further gearboxes.

Per step 216, the bitcount may be "serialized" to a synchronous pulse, and an associated bit-position offset may be generated, by a synchronous pulse generator (count→serial+offset) circuit. This circuit generates the synchronous pulse and a bit offset. The synchronous pulse may be generated by outputting a logical one when the bit # is zero and outputting a logical zero for other values of the bit #. The bit-position offset indicates which bit in the data word width is bit #=0 (i.e. is the location of the predetermined count). For example, for the 66-bit wide data word that is depicted in FIG. 1, the bit offset may be a 7-bit number that represents a bit offset that can range from 0 to 65. For example, if the bit offset is 9, then the effective synchronous time is adjusted by $\overrightarrow{9/66}$ths of a cycle. Further per step 216, the time of receipt of the synchronous pulse at the core may be measured and recorded.

Per step 220, the latency may be computed by subtracting the time that the asynchronous signal was received at the core (measured and recorded in step 206) from the time that the synchronous signal was received at the core (measured and recorded in step 216).

The measured latency may be further adjusted by adding the asynchronous propagation (flight) time, which may be previously estimated, derived from static timing analysis, or measured so as to obtain the approximate latency. For example, if the core receives the asynchronous signal at time t=100 nanoseconds (ns) and the synchronous signal at time t=250 ns, then the difference is 150 ns. If the asynchronous propagation time is estimated to be 1.5 ns, then the approximate latency is 151.5 ns.

Per step 222, the precision may be increased by computing a bit-position delay and adjusting the latency by adding the bit-position delay. The bit-position delay may be generated by multiplying the bit-position offset by the incremental delay for one bit of the serial signal. For example, for a 10.3125 gigabit per second (Gbps) serial signal, the incremental delay for one bit corresponds to one bit period which is 97 picoseconds (ps). If the bit-position offset indicates that the beginning of the FEC frame corresponds to bit 12 of the 32-bit word, then the bit-position delay=12×97 ps=1.164 nanoseconds (ns). If the latency from step 220 is 151.5 ns, then the latency would be adjusted to be 151.5 ns+1.164 ns=152.66 ns.

Finally, per step 224, the latency may be used to generate a time stamp that indicates the time of receipt of the word associated with the synchronous signal at the input pin of the receiver.

Figure 3:
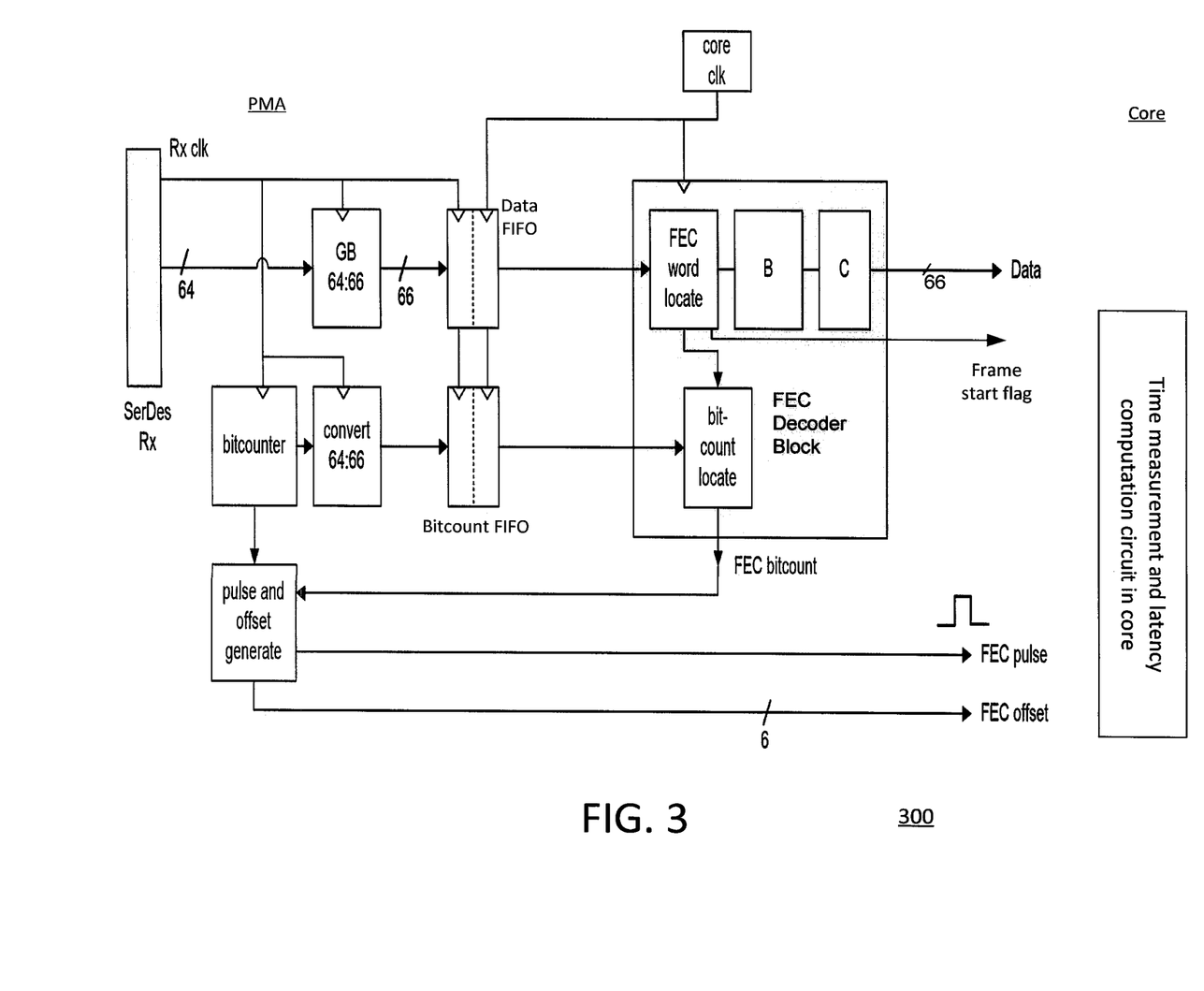
FIG. 3 depicts circuit apparatus for measuring latency of receiver processing circuitry in a receiver with a frame detector circuit (for example a FEC decoder) in accordance with an embodiment of the invention.
Figure 4:
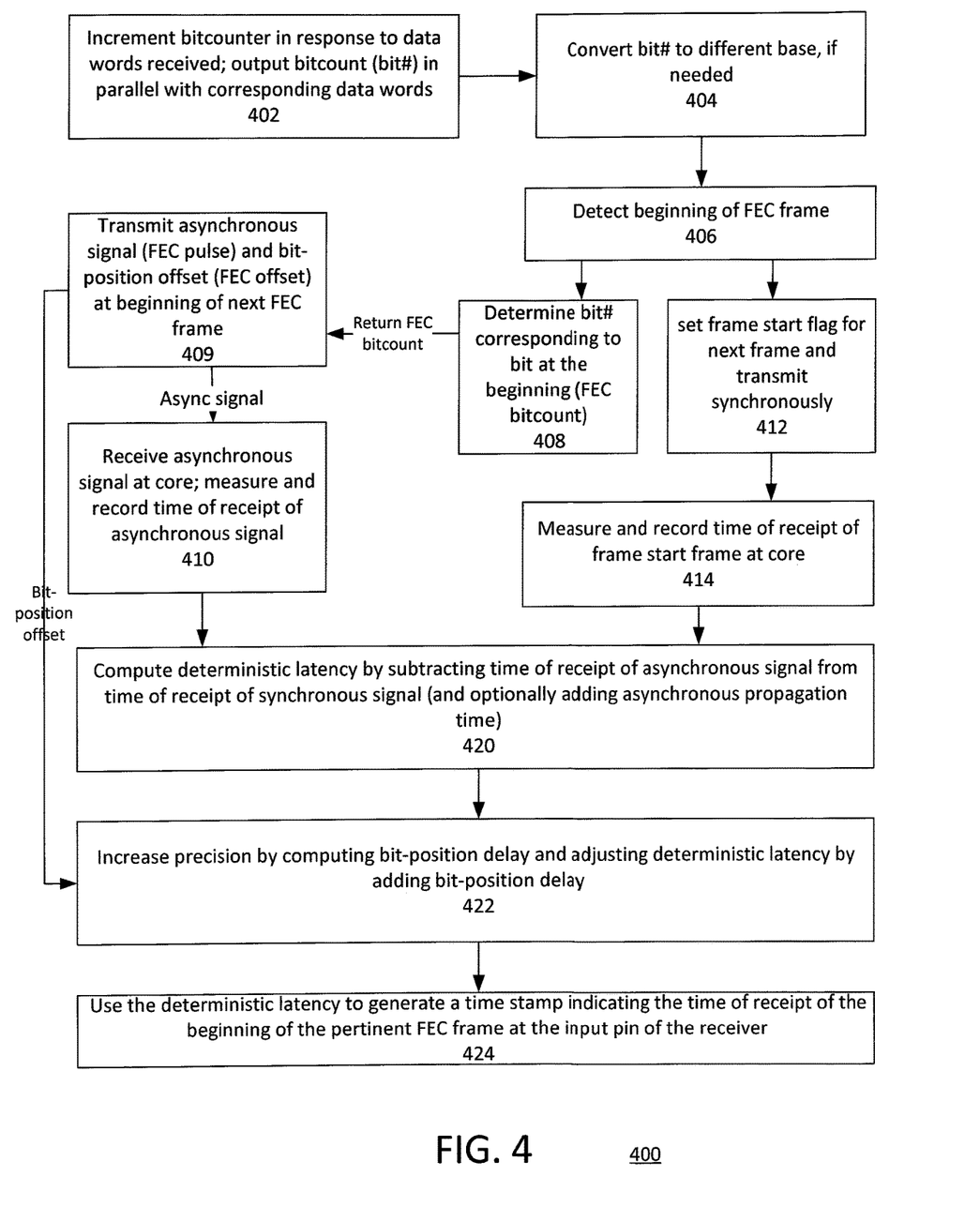
FIG. 4 is a flow chart of a method of measuring latency of receiver processing circuitry in a receiver with a frame detector circuit (for example a FEC decoder) using the circuit apparatus of FIG. 3 in accordance with an embodiment of the invention.

FIG. 3 depicts circuit apparatus 300 for measuring latency of receiver processing circuitry in a receiver with a frame detector (for example a FEC frame decoder) in accordance with an embodiment of the invention. FIG. 4 is a flow chart of a method 400 of measuring latency of receiver (RX) processing circuitry in a receiver with a frame detector (for example a FEC frame decoder) using the circuit apparatus 300 of FIG. 3 in accordance with an embodiment of the invention.

The circuit apparatus 300 and method 400 may be used for measuring precisely a variable delay between an input/output pin and a point of measurement within the integrated circuit. The delay measurement may be made across an FEC decoder and various additional RX processing circuitry, such as physical coding sublayer circuitry and media access layer circuitry, for example.

Per step 402 of the method 400 of FIG. 4, in response to data words being received from the deserializer circuit (SerDes Rx) of the receiver, a bitcounter circuit is incremented by the number of bits in the data words. The bitcounter resets to zero at a predetermined count so as to effectively give a unique bit-number (bit #) to each bit within a bitcount cycle length of the data stream. In this case, the predetermined count is equal to the number of bits in the FEC frame. An exemplary bitcounter circuit may be implemented in the physical media attachment (PMA) circuitry after the deserializer circuit, as depicted in FIG. 3. For each data word received, the bitcounter circuit may be incremented by the width of the data word. For example, if the data word is 64 bits wide, as depicted in FIG. 3, then the bitcounter circuit shall be incremented by 64 for each word received. For example, the bitcounter circuit may be incremented from 0 to 64, then from 64 to 128, and so on. The bitcount value for a given word represents the bit-number (bit #) of the bit within the word that arrived first at the deserializer.

Further per step 402, the bitcount is output in parallel with the corresponding data word. From this point on, the bitcount follows the data path synchronously. As depicted in FIG. 3, the 64 bits of the data word are output from SerDes RX to the 64:66 gearbox (GB 64:66), and the bitcount is output from the bitcounter circuit to the 64:66 converter circuit (convert 64:66).

Per step 404, the bitcount may be converted to a different base, if needed (for example, due to the presence of a gearbox circuit). In the exemplary implementation shown in FIG. 3, the 64:66 converter circuit (convert 64:66) converts the bitcount from a base of 64 to a base of 66. In other words, the 64:66 converter receives input bitcounts of 0, 64, 128, 192, 256, . . . and generates output bitcounts of 0, 66, 132, 198, . . . . This conversion is performed so that the bitcounts are correct for both the 64-bit data words input into GB 64:66 and the 66-bit data words output from GB 64:66.

Per step 406, the beginning of a FEC frame is detected by the FEC word locate circuit. After the detection of the beginning of the FEC frame, both an asynchronous signal and a synchronous signal may be generated and transmitted at the beginning of the next FEC frame.

Steps 408, 409 and 410 pertain primarily to the transmission and receipt of the asynchronous signal. Per step 408, the bitcount (bit #) corresponding to the bit at the beginning of the FEC frame may be determined. This bitcount corresponding to the beginning of the FEC frame may be referred to herein as the "FEC bitcount". This step may be performed by the bitcount locate circuit in FIG. 3. As shown by the arrow going from step 408 to 410 in FIG. 4, the FEC bitcount may be returned (fed back) from the bitcount locate circuit in the FEC decoder block to the pulse and offset generate circuit, as depicted in FIG. 3. As the bitcount cycle length is equal to the FEC frame length, the "FEC bitcount" will be the same for each frame and thus constant.

Per step 409, an asynchronous signal (FEC pulse) and bit-position offset (FEC offset) are generated and transmitted at the beginning of a subsequent FEC frame. The beginning of a subsequent FEC frame may be determined using the bit # and the FEC bitcount. When the bit # is equal to the FEC bitcount, then that bit # corresponds to the beginning of a subsequent FEC frame. As shown in FIG. 3, this step may be performed by the pulse and offset generate circuit.

As further depicted in FIG. 3, for a 64-bit data word, the bit-position offset may be a 6-bit number to indicate which of the 64 bit positions in the data word corresponds to the beginning of the FEC frame. This bit-position offset is used to increase the accuracy of the asynchronous signal, as described below in relation to step 422.

Per step 410, the asynchronous signal (and the bit-position offset) may be received at the core logic, and the time of receipt of the asynchronous signal may be measured and recorded. As shown in FIG. 3, this step may be performed by time measurement and latency computation circuitry located in the core of the integrated circuit.

Steps 412 and 414 pertain to the transmission and receipt of the synchronous signal. Per step 412, a frame start flag may be set when the data word is received that contains the beginning of the next FEC frame. The frame start flag is a synchronous signal that is transmitted in parallel and synchronously with that data word as it is processed by the FEC decoder and by subsequent RX processing circuitry. It is accompanied by offset information which indicates the bit position of the frame start within the data word. The synchronous signal travels to the core much more slowly than the asynchronous signal because the synchronous signal is delayed to be synchronous with the RX processing of the data.

Per step 414, the synchronous signal may be received at the core logic, and the time of receipt of the synchronous signal may be measured and recorded. As shown in FIG. 3, this step may be performed by time measurement and latency computation circuitry located in the core of the integrated circuit.

Per step 420, the latency may be computed by subtracting the time that the asynchronous signal was received at the core (measured and recorded in step 410) from the time that the synchronous signal was received at the core (measured and recorded in step 414).

The latency may be further adjusted by adding the asynchronous propagation (flight) time, which may be previously estimated, derived from static timing analysis or measured, so as to obtain the latency. For example, if the core receives the asynchronous signal at time t=100 nanoseconds (ns) and the synchronous signal at time t=250 ns, then the difference is 150 ns. If the asynchronous propagation time is estimated to be 1.5 ns, then the latency is 151.5 ns.

Per step 422, the precision may be increased by computing a bit-position delay and adjusting the latency by adding the bit-position delay. The bit-position delay may be generated by multiplying the FEC offset by the incremental delay for one bit of the serial signal. For example, for a 10.3125 gigabit per second (Gbps) serial signal, the incremental delay for one bit corresponds to one bit period which is 97 picoseconds (ps). If the FEC offset indicates that the beginning of the FEC frame corresponds to bit 12 of the 32-bit word, then the bit-position delay=12×97 ps=1.164 nanoseconds (ns). If the latency from step 420 is 151.5 ns, then the latency would be adjusted to be 151.5 ns+1.164 ns=152.66 ns.

Finally, per step 424, the latency may be used to generate a time stamp that indicates the time of receipt of the word associated with the synchronous signal at the input pin of the receiver.

Transmitter (TX) Embodiment

While the present disclosure provides a detailed description of the invented technique as embodied in a receiver, the invented technique may also be embodied in a transmitter. While the receiver flow goes from SerDes RX circuit to the core of the integrated circuit, the transmitter flow goes from the core to the SerDes TX (i.e. the serializer) circuit.

The device core for the transmitter embodiment includes a bitcounter, similar to the one for the receiver embodiment, which numbers all the bits in the transmit datastream in a similar way. The bit # is forwarded with the data in a similar way, and when the data word containing a given bit # (e.g. zero) arrives at the SerDes TX serializer, an asynchronous pulse is generated back towards the core, together with an offset indicating which bit in the word was bit number zero. The bitcount cycle length may be a multiple of the number of bits in the datapath at the serializer (e.g. 64) which will make this offset constant.

Exemplary Field Programmable Gate Array and Electronic System

Figure 5:
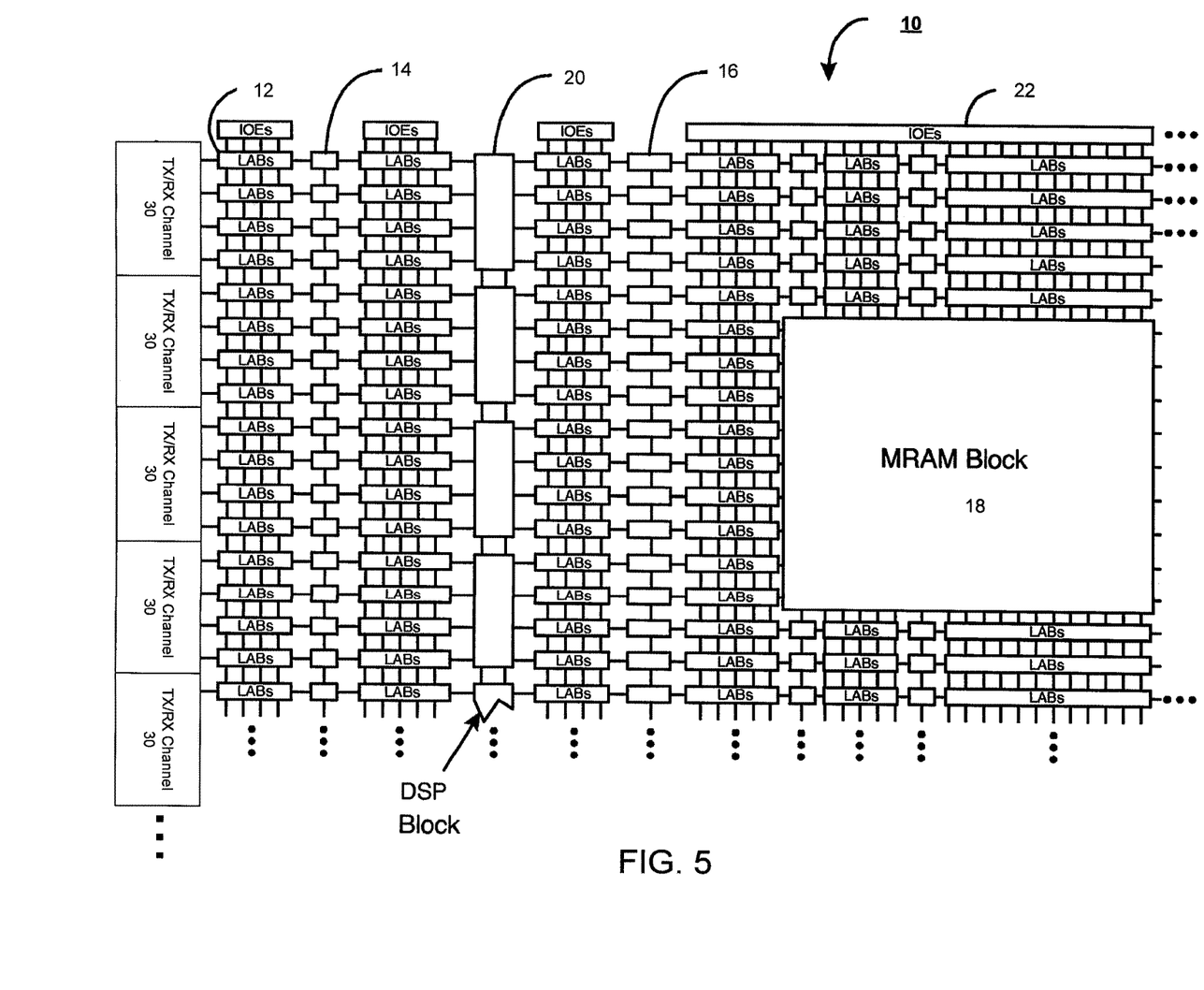
FIG. 5 is a simplified partial block diagram of a field programmable gate array (FPGA) that may be arranged to include aspects of the present invention.

FIG. 5 is a simplified partial block diagram of a field programmable gate array (FPGA) 10 that may be arranged to include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs.

It is to be understood that FPGA 10 is described herein for illustrative purposes only and that the present invention can be implemented in many different types of PLDs, FPGAs, and ASICs.

Figure 6:
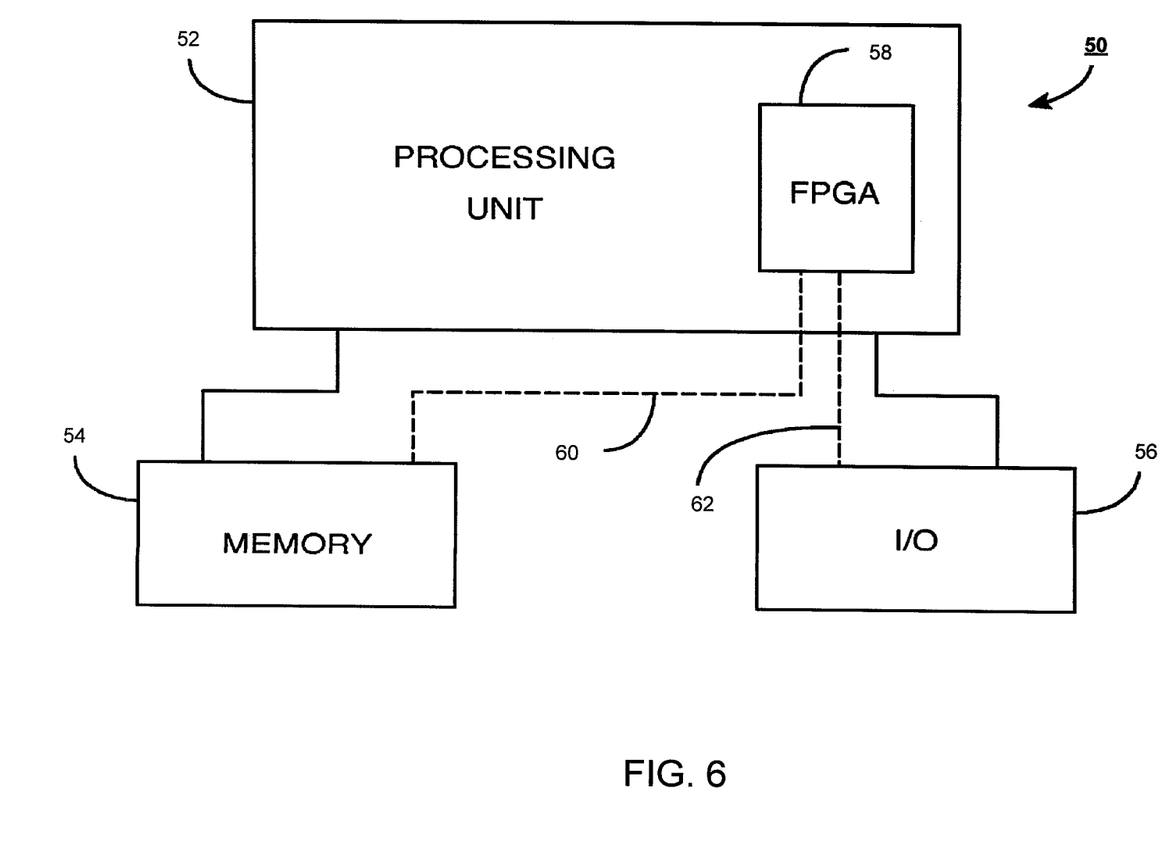
FIG. 6 is a block diagram of an exemplary digital system that can employ techniques of the present invention.

FIG. 6 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

CONCLUSION

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for performing a latency measurement within an integrated circuit, the method comprising:
    detecting receipt of a word that contains a bit at a beginning of a frame by a frame begin detect circuit in a decoding circuit block;
    feeding back a begin frame detected signal to a physical media attachment circuit;
    transmitting an asynchronous signal from the physical media attachment circuit to a time measurement circuit in a core of the integrated circuit; and
    measuring a first time corresponding to receipt of the asynchronous signal at the core of the integrated circuit.

2. The method of claim 1, further comprising:
    setting a frame start flag associated with the word to indicate that the word contains the bit at the beginning of the frame;
    processing the word by receiver processing blocks;
    forwarding the frame start flag along with the word as the word is processed by the receiver processing blocks;
    measuring a second time corresponding to receipt of the word associated with the frame start flag at the core of the integrated circuit; and
    subtracting the first time from the second time to generate the measured latency.

3. The method of claim 2, further comprising:
    generating a timestamp using the measured latency.

4. The method of claim 2, further comprising:
    increasing the measured latency by an asynchronous propagation time.

5. The method of claim 2, further comprising:
    recording a bit-position offset of the beginning of the frame.

6. The method of claim 5, further comprising:
computing a bit-position delay by multiplying the bit-position offset by a delay per bit; and
increasing the measured latency by the bit-position delay.

7. The method of claim 1, wherein the frame comprises a forward error correction code frame, and wherein the decoding circuit block comprises a forward error correction decoder.

8. An integrated circuit comprising:
physical media attachment circuitry that deserializes a serial data stream to generate data words;
a bitcounter circuit that increments a bitcount by a number of bits in the data words;
a frame start detect circuit in a decoding circuit block that receives the data words and detects a bit location in a data word that begins a frame;
a bitcount locate circuit that uses the bitcount and the bit location to determine a frame start bitcount that is fed back to the physical media attachment circuitry; and
pulse generate circuitry in the physical media attachment circuitry that receives the frame start bitcount and generates and transmits an asynchronous pulse.

9. The integrated circuit of claim 8, wherein the frame start detect circuit sets a frame start flag associated with the data word that begins the frame.

10. The integrated circuit of claim 9, further comprising:
receiver processing blocks that process the data words, wherein the frame start flag is forwarded along with the data word that begins the frame as the data word is processed by the receiver processing blocks.

11. The integrated circuit of claim 10, further comprising:
a time measurement circuit that measures a first time corresponding to receipt of the asynchronous pulse and a second time corresponding to receipt of the frame start flag; and
a latency computation circuit that generates a measured latency by subtracting the first time from the second time.

12. The integrated circuit of claim 11, wherein the latency computation circuit increases the measured latency by an asynchronous propagation time.

13. The integrated circuit of claim 11, further comprising:
offset generate circuitry in the physical media attachment circuitry that generates and transmits a bit-position offset.

14. The integrated circuit of claim 13, wherein
the latency computation circuit computes a bit-position delay by multiplying the bit-position offset by a delay per bit and increases the measured latency by the bit-position delay.

15. A method for performing a latency measurement within an integrated circuit, the method comprising:
incrementing a bitcounter by a number of bits in data words received;
outputting a bitcount sequence from the bitcounter, wherein a synchronous signal comprises the bitcount sequence;
transmitting an asynchronous signal upon occurrence of a predetermined count in the bitcount sequence; and
having the synchronous signal follow the data words in a synchronous manner as the data words are processed by receiver processing circuitry.

16. The method of claim 15, wherein generation of the bitcount sequence involves the bitcounter wrapping to zero.

17. The method of claim 15, further comprising:
serializing the bitcount sequence to a synchronous pulse; and
generating a bit offset based on the bitcount sequence and the predetermined count.

18. The method of claim 17, further comprising:
measuring a first time corresponding to receipt of the asynchronous signal;
measuring a second time corresponding to receipt of the synchronous pulse; and
subtracting the first time from the second time to generate the measured latency.

19. The method of claim 18, further comprising:
adjusting the measured latency by adding the bit offset multiplied by a per bit delay.

20. The method of claim 19, further comprising:
generating a timestamp using the measured latency.

* * * * *